(12) United States Patent
Nakamura et al.

(10) Patent No.: US 9,761,860 B2
(45) Date of Patent: Sep. 12, 2017

(54) SECONDARY BATTERY AND METHOD FOR PRODUCING SECONDARY BATTERY

(71) Applicant: TOYOTA JIDOSHA KABUSHIKI KAISHA, Toyota-shi, Aichi (JP)

(72) Inventors: Kosuke Nakamura, Nisshin (JP); Naoyuki Wada, Nagoya (JP); Ichiro Murata, Settsu (JP); Yukihiro Okada, Shijonawate (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 123 days.

(21) Appl. No.: 14/607,642

(22) Filed: Jan. 28, 2015

(65) Prior Publication Data

US 2015/0214537 A1 Jul. 30, 2015

(30) Foreign Application Priority Data

Jan. 30, 2014 (JP) ................................. 2014-015947

(51) Int. Cl.
H01M 2/34 (2006.01)
H01M 10/04 (2006.01)
H01M 2/06 (2006.01)
H01M 2/30 (2006.01)

(52) U.S. Cl.
CPC .............. *H01M 2/345* (2013.01); *H01M 2/06* (2013.01); *H01M 2/30* (2013.01); *H01M 10/04* (2013.01); *H01M 2200/20* (2013.01); *Y10T 29/49114* (2015.01)

(58) Field of Classification Search
None
See application file for complete search history.

(56) References Cited

U.S. PATENT DOCUMENTS

| 6,117,586 A | 9/2000 | Kim et al. |
| 2008/0038627 A1 | 2/2008 | Yamaguchi et al. |
| 2009/0092860 A1 | 4/2009 | Yamamoto et al. |
| 2011/0200870 A1 | 8/2011 | Kim et al. |
| 2014/0335389 A1 | 11/2014 | Takahata |
| 2015/0171411 A1 | 6/2015 | Kobayashi et al. |
| 2015/0303441 A1 | 10/2015 | Takagi |

FOREIGN PATENT DOCUMENTS

| JP | 11-162437 A | 6/1999 |
| JP | 2008066254 A | 3/2008 |
| JP | 2009-099542 A | 5/2009 |

(Continued)

Primary Examiner — Patrick Ryan
Assistant Examiner — Christopher Domone
(74) Attorney, Agent, or Firm — Sughrue Mion, PLLC

(57) ABSTRACT

Disclosed is a secondary battery capable of preventing damage to a current interrupt device caused by generation and transmission of vibration, and thereby achieving prevention of malfunction of the current interrupt device, and improvement of quality of the secondary battery. In addition, disclosed is a method of manufacturing the secondary battery. Specifically disclosed is a secondary battery, in which a positive electrode terminal is placed on the upper face of a sealing plate, a holder is placed on the lower face of the sealing plate, and the sealing plate is joined to the positive electrode terminal and the holder by a rivet. The secondary battery includes an adhered portion for adhering the holder to the sealing plate.

6 Claims, 8 Drawing Sheets

(56) References Cited

FOREIGN PATENT DOCUMENTS

| | | | |
|---|---|---|---|
| JP | 2011165643 A | | 8/2011 |
| JP | 2011-243559 A | | 12/2011 |
| JP | 2011243559 | * | 12/2011 |
| JP | 2012-230905 A | | 11/2012 |
| KR | 1020110093372 A | | 8/2011 |
| WO | 2013/076831 A1 | | 5/2013 |
| WO | 2013/093987 A1 | | 6/2013 |
| WO | 2013/164897 A1 | | 11/2013 |

* cited by examiner

PRIOR ART

PRIOR ART

SECONDARY BATTERY AND METHOD FOR PRODUCING SECONDARY BATTERY

TECHNICAL FIELD

The present invention relates to a technique for a secondary battery and a method of manufacturing the secondary battery.

BACKGROUND ART

A secondary battery generally includes a CID (Current Interrupt Device) in case of excessive increase in internal pressure.

There is a known current interrupt device which includes a reverse plate acting as a diaphragm and a holder as an insulator for holding the reverse plate, the reverse plate being welded to a collector tab of a positive electrode at a predetermined welding strength.

In such a current interrupt device, when internal pressure of a secondary battery increases, the reverse plate pushed by electrolyte solution is reversed and separated from the collector tab (conduction is blocked) to interrupt electric current. For this purpose, in the current interrupt device with this structure, the welding strength between the collector tab and the reverse plate is set to a value lower than joint strengths between other portions.

Therefore, a welded portion between the collector tab and the reverse plate in the current interrupt device is broken more easily than the other portions.

As a secondary battery including a current interrupt device, there is a publicly known secondary battery disclosed in JP-A 2011-243559 described below, for example.

The conventional secondary battery shown in JP-A 2011-243559 includes a current interrupt device which has a reverse plate acting as a diaphragm and connected to a rivet, and a holder as an insulator for holding a collector tab of a positive electrode, and which is formed by welding the reverse plate to the collector tab of the positive electrode at a predetermined welding strength. In the conventional secondary battery, a positive electrode terminal is placed on the upper face of a sealing plate, and the holder is placed on the lower face of the sealing plate. In addition, the positive electrode terminal and the holder are joined to the sealing plate by the rivet, and thereby the positive electrode terminal and the collector tab of the positive electrode are electrically connected via the rivet and the reverse plate.

FIGS. 7 and 8 show a structure around the positive electrode in the conventional secondary battery.

As shown in FIG. 7, a positive electrode 50 in the conventional secondary battery includes a current interrupt device 45 which has a reverse plate 41 acting as a diaphragm and connected to a rivet 48 and a holder 42 as the insulator for holding a collector tab 44 of the positive electrode 50, and which is formed by welding the reverse plate 41 to the collector tab 44 in a welded portion 43 at a predetermined welding strength. A positive electrode terminal 47 is placed on one face (upper face in FIG. 7) of a sealing plate 46, and the holder 42 is placed on the other face (lower face in FIG. 7) of the sealing plate 46. The positive electrode terminal 47 and the holder 42 are joined to the sealing plate 46 by caulking the rivet 48, and thereby the positive electrode terminal 47 and the collector tab 44 are electrically connected via the rivet 48 and the reverse plate 41. Between the sealing plate 46 and the positive electrode terminal 47, an insulator 21 and a gasket 22 are provided.

As shown in FIG. 8, in the positive electrode 50, the holder 42 is fitted in a recess 46a formed on the lower face of the sealing plate 46, and a gap is formed between a peripheral edge of the recess 46a and the holder 42. In the conventional positive electrode 50, the holder 42 is merely joined by the rivet while fitted in the recess 46a.

As shown in FIG. 8, in the conventional secondary battery shown in JP-A 2011-243559, since the holder 42 is fitted in the recess 46a of the sealing plate 46 to join the holder 42 and the sealing plate 46 together in the positive electrode 50, there is the gap between the holder 42 and the peripheral edge of the recess 46a of the sealing plate 46 in the fitted portion.

If there is the gap between the holder 42 and the sealing plate 46, vibration may be caused by displacement of the holder 42 and the sealing plate 46 with respect to each other and collisions between them. The vibration is transmitted to the current interrupt device 45, which may damage the welded portion 43 between the reverse plate 41 and the collector tab 44.

If there is damage such as a crack in the welded portion 43, the current interrupt device 45 is actuated at lower internal pressure. Therefore, the damage to the welded portion 43 may cause a malfunction of the current interrupt device 45.

SUMMARY OF INVENTION

Problem to be Solved by the Invention

In a secondary battery including a current interrupt device in which a reverse plate and a collector tab are welded to each other, a technique for reliably preventing damage to a welded portion between the reverse plate and the collector tab is required.

The present invention is made in view of such a problem under the present circumstances. The object of the present invention is to provide a secondary battery capable of preventing damage to a current interrupt device caused by generation and transmission of vibration, and thereby achieving prevention of malfunction of the current interrupt device, and improvement of quality of the secondary battery. In addition, the object of the present invention is to provide a method of manufacturing the secondary battery.

Means for Solving the Problem

The problem to be solved by the present invention is described above, and means for solving the problem are described below.

According to a first aspect of the present invention, there is provided a secondary battery including a rivet, a collector tab, a current interrupt device which includes a reverse plate acting as a diaphragm and connected to the rivet, and a holder as an insulator for holding the collector tab, and which is formed by welding the reverse plate to the collector tab at a predetermined welding strength, a positive electrode terminal, a sealing plate which is joined to the positive electrode terminal and the holder by the rivet, the positive electrode terminal being placed on an upper face of the sealing plate, the holder being placed on a lower face of the sealing plate, and an adhered portion for adhering the holder to the sealing plate.

According to a second aspect of the present invention, the sealing plate includes a recess conforming in shape to the holder, the recess being formed on the lower face of the sealing plate. The holder includes a protrusion protruding in a direction perpendicular to a direction in which the holder and the sealing plate are stacked. The adhered portion is formed by adhering the protrusion to the sealing plate while the holder is fitted in the recess.

According to a third aspect of the present invention, the adhered portion is formed by fusing the protrusion to the sealing plate while the holder is fitted in the recess.

According to a fourth aspect of the present invention, there is provided a method of manufacturing a secondary battery, including a first step for preparing a rivet, a second step for preparing a collector tab, a third step for preparing a current interrupt device which includes a reverse plate acting as a diaphragm and connected to the rivet, and a holder as an insulator for holding the collector tab, and which is formed by welding the reverse plate to the collector tab at a predetermined welding strength, a fourth step for preparing a positive electrode terminal, a fifth step for preparing a sealing plate, a sixth step for joining the positive electrode terminal and the holder to the sealing plate with the rivet while placing the positive electrode terminal on an upper face of the sealing plate and placing the holder on a lower face of the sealing plate, and a seventh step for adhering the holder to the sealing plate.

According to a fifth aspect of the present invention, the method of manufacturing the secondary battery further includes a step for forming a recess conforming in shape to the holder on the lower face of the sealing plate, and a step for forming a protrusion on the holder, the protrusion protruding in a direction perpendicular to a direction in which the holder and the sealing plate are stacked. In the seventh step, the protrusion is adhered to the sealing plate while the holder is fitted in the recess.

According to a sixth aspect of the present invention, in the seventh step, the protrusion is fused to the sealing plate while the holder is fitted in the recess.

Effects of the Invention

The present invention exerts the following effects.

According to a first aspect of the present invention, damage to a welded portion between a reverse plate and a collector tab caused by generation and transmission of vibration can be prevented.

As a result, a malfunction of the current interrupt device can be prevented, and airtightness of a secondary battery can be secured, which improves quality of the secondary battery.

According to a second aspect of the present invention, a sealing plate and a holder can be easily adhered to each other, and damage to the welded portion can be prevented with a simple structure.

According to a third aspect of the present invention, the sealing plate and the holder can be more easily and reliably adhered to each other.

According to a fourth aspect of the present invention, damage to the welded portion between the reverse plate and the collector tab caused by generation and transmission of the vibration can be prevented.

As a result, the malfunction of the current interrupt device can be prevented, and the airtightness of the secondary battery can be secured, which improves quality of the secondary battery.

According to a fifth aspect of the present invention, the sealing plate and the holder can be easily adhered to each other, and damage to the welded portion can be prevented with a simple structure.

According to a sixth aspect of the present invention, the sealing plate and the holder can be more easily and reliably adhered to each other.

BRIEF DESCRIPTION OF DRAWINGS

FIGS. 2A and 2B show a structure around a current interrupt device (a section along line A-A in FIG. 1) in the secondary battery according to the one embodiment of the present invention, in which FIG. 2A shows a first embodiment, and FIG. 2B shows a second embodiment.

FIGS. 4A and 4B show a mounting structure of the current interrupt device in the secondary battery, in which FIG. 4A shows the secondary battery according to the one embodiment of the present invention, and FIG. 4B shows a conventional secondary battery.

DESCRIPTION OF EMBODIMENTS

Hereinafter, preferred embodiments of the present invention will be described.

First, a structure of a secondary battery according to one embodiment of the present invention will be described with reference to FIG. 1.

Figure 1:
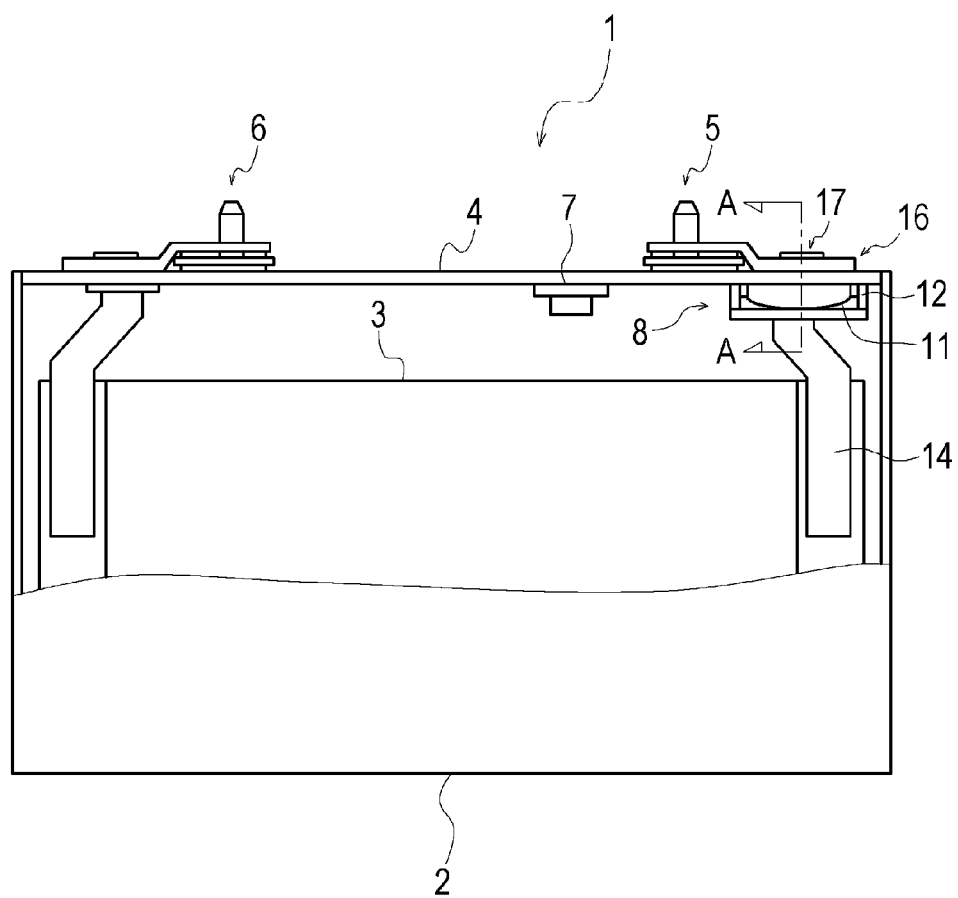
FIG. 1 shows an overall structure of a secondary battery according to one embodiment of the present invention.

As shown in FIG. 1, a secondary battery 1 according to the one embodiment of the invention is a nonaqueous electrolyte secondary battery. The secondary battery 1 includes a prismatic battery case 2, a wound electrode body 3, a sealing plate 4, a positive electrode 5, a negative electrode 6, and a safety valve 7. In addition, the secondary battery 1 includes a current interrupt device 8 in the positive electrode 5. The secondary battery 1 is formed by sealing the electrode body 3 and electrolyte solution (not shown) in a sealed space formed by the battery case 2 and the sealing plate 4.

The sealing plate 4 is a plate-shaped member for performing a function of sealing an open face of the battery case 2, has an upper face 4a and a lower face 4b, and performs a function of fixing the positive electrode 5 and the negative electrode 6. The upper face 4a is a face which appears on an outer side of the secondary battery 1 and the lower face 4b is a face which is hidden in the secondary battery 1.

The sealing plate 4 shown in the embodiment is formed into a predetermined shape having a recess 4c in the lower face 4b by pressing an aluminum plate material. By laser-welding the sealing plate 4 to an opening of the battery case 2, the opening is sealed.

The recess 4c conforms to a shape of a holder 12 and the holder 12 is fitted in the recess 4c to thereby prevent displacement of the sealing plate 4 and the holder 12 with respect to each other in a direction perpendicular to the direction in which the sealing plate 4 and the holder 12 are stacked.

Next, a structure around the current interrupt device 8 in the secondary battery 1 will be described by using FIGS. 2A to 6.

Figure 2A:
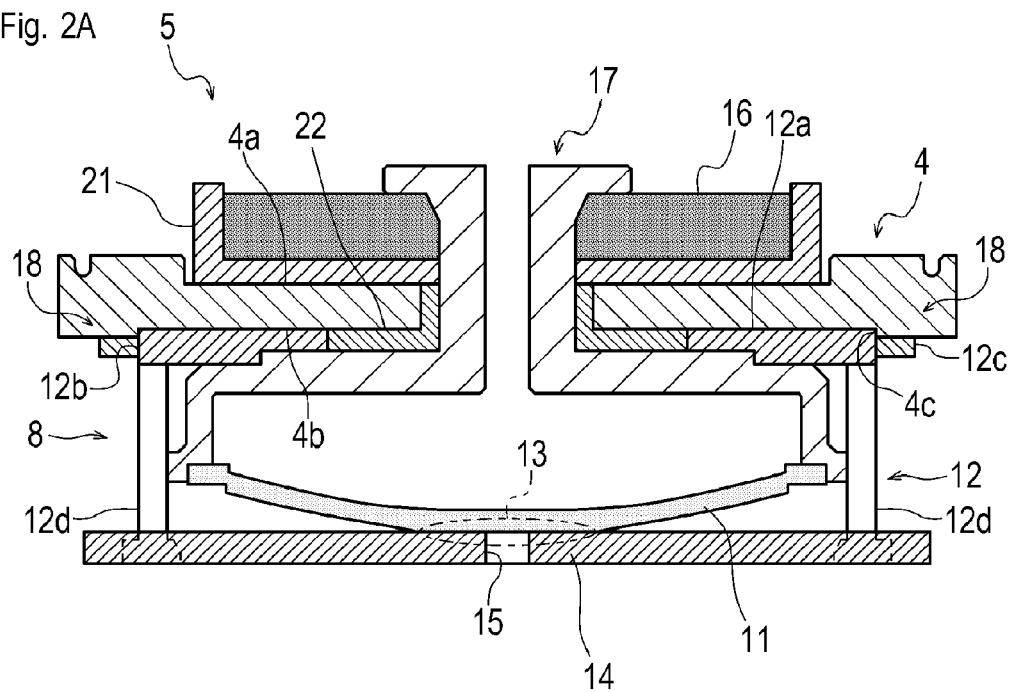

FIG. 2A shows the first embodiment of a structure around the positive electrode 5 in the secondary battery 1.

As shown in FIG. 2A, the positive electrode 5 of the secondary battery 1 according to the first embodiment includes the current interrupt device 8 which has a reverse plate 11 acting as a diaphragm and connected to a rivet 17, and the holder 12 as an insulator for holding a collector tab 14 of the positive electrode, and which is formed by welding the reverse plate 11 to the collector tab 14 of the positive electrode with a predetermined strength at a welded portion 13. The positive electrode terminal 16 is placed to come in contact with one face (upper face 4a) of the sealing plate 4, the holder 12 is placed to come in contact with the other face (lower face 4b) of the sealing plate 4, the positive electrode terminal 16 and the holder 12 are joined to the sealing plate 4 by the rivet 17, and the positive electrode terminal 16 and the collector tab 14 of the positive electrode are electrically connected by the rivet 17 and the reverse plate 11. Between the sealing plate 4 and the positive electrode terminal 16, an insulating member 21 and a gasket 22 are provided.

The reverse plate 11 has a substantially bowl-shaped curved face and is a member (what is called a diaphragm) having the curved face a protruding direction of which changes when pressure is applied thereto.

The reverse plate 11 shown in the embodiment is made of aluminum.

The holder 12 is a member formed by the insulator for holding the collector tab 14 and has a main body 12a which is a plate-shaped portion to be in contact with the lower face 4b of the sealing plate 4. At a substantially central position of the main body 12a, a hole through which the rivet 17 is inserted is formed.

Moreover, protrusions 12c are formed at the main body 12a of the holder 12.

The protrusions 12c are formed to protrude from end faces 12b of the main body 12a in the direction perpendicular to the direction in which the sealing plate 4 and the holder 12 are stacked.

A protruding height of each of the protrusions 12c from the end face 12b is preferably such a height that a top of the protrusion 12c reaches a position on an outer side of the recess 4c when the holder 12 is fitted in the recess 4c.

From the main body 12a, four legs 12d are formed to protrude to hold the collector tab 14.

The holder 12 shown in the embodiment is made of PEEK (polyether ether ketone) resin.

The collector tab 14 is a member for electrically connecting the electrode body 3 and the positive electrode terminal 16, connected to a positive-side collector foil member of the electrode body 3, and supported in the battery case 2 by the sealing plate 4 with the holder 12 interposed therebetween.

A through hole 15 is formed in the collector tab 14 so that the electrolyte solution can press the reverse plate 11 through the through hole 15 when internal pressure of the secondary battery 1 increases.

When the internal pressure of the secondary battery 1 increases above a predetermined threshold value, the reverse plate 11 is pressed by the electrolyte solution and deformed toward the sealing plate 4 to thereby rupture the welded portion 13 to block conduction between the collector tab 14 and the positive electrode terminal 16 (more specifically, conduction between the collector tab 14 and the reverse plate 11) to reliably interrupt the electric current.

The collector tab 14 and the positive electrode terminal 16 shown in the embodiment are made of aluminum.

Figure 3:
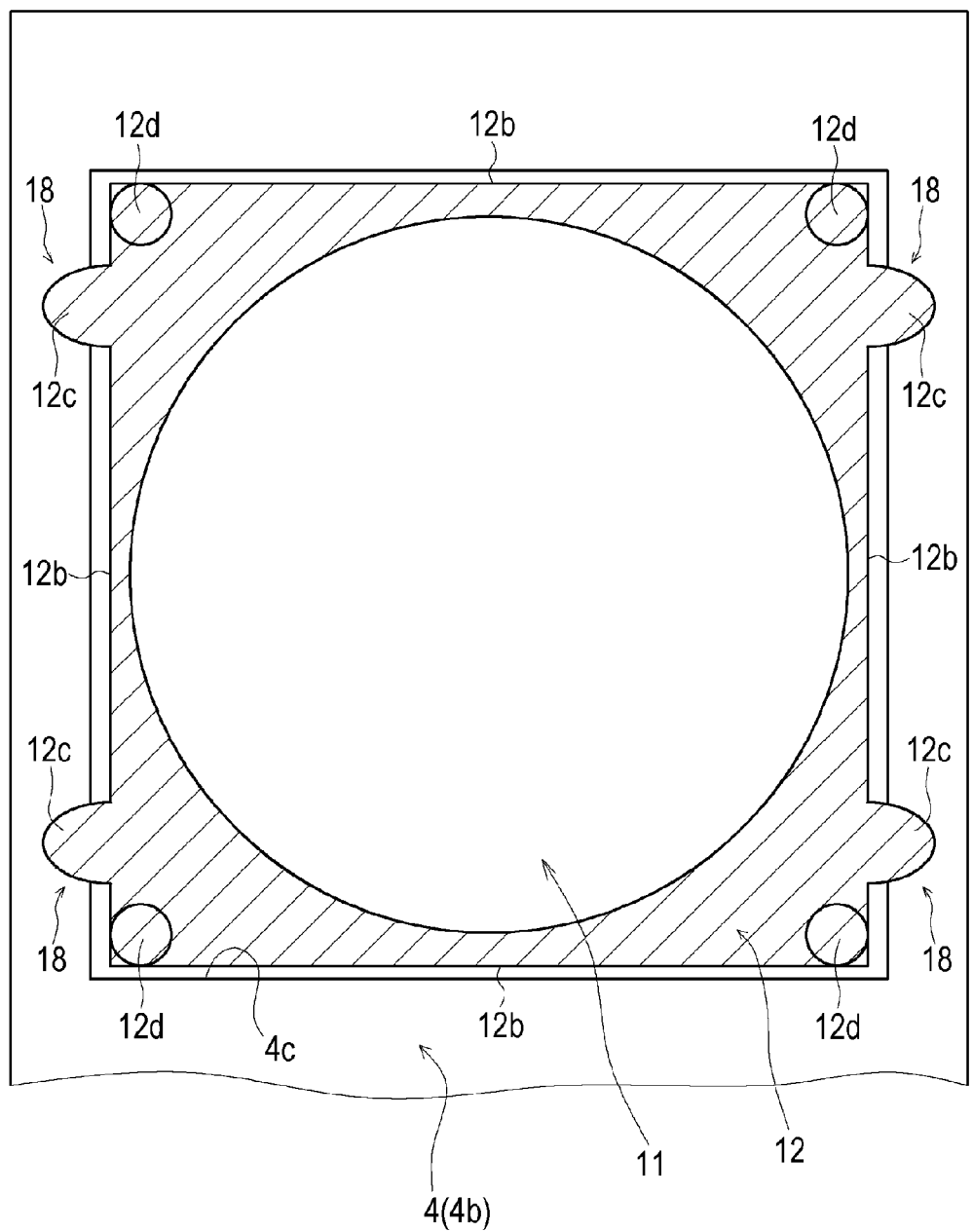
FIG. 3 shows a condition (the first embodiment) in which adhered portions are formed in the secondary battery according to the one embodiment of the present invention.

As shown in FIG. 3, in the positive electrode 5, the holder 12 is fitted in the recess 4c formed in the lower face of the sealing plate 4, and the sealing plate 4 and the protrusions 12c are fused to form adhered portions 18.

In other words, in the positive electrode 5 in the secondary battery 1 according to the one embodiment of the present invention, the holder 12 (protrusions 12c) is (are) adhered to the sealing plate 4.

FIG. 3 shows a state before the collector tab 14 is fixed and a view of the reverse plate 11 and the holder 12 from below (the side of the lower face 4b) (the same holds true for FIGS. 5, 6, and 8).

Although the sealing plate 4 and the protrusions 12c of the holder 12 are fused to form the adhered portions 18 in the example shown in the embodiment, a method of forming the adhered portions 18 is not limited to it. For example, the sealing plate 4 and the protrusions 12c of the holder 12 may be glued by adhesive or the like to form the adhered portions 18.

Figure 4A:
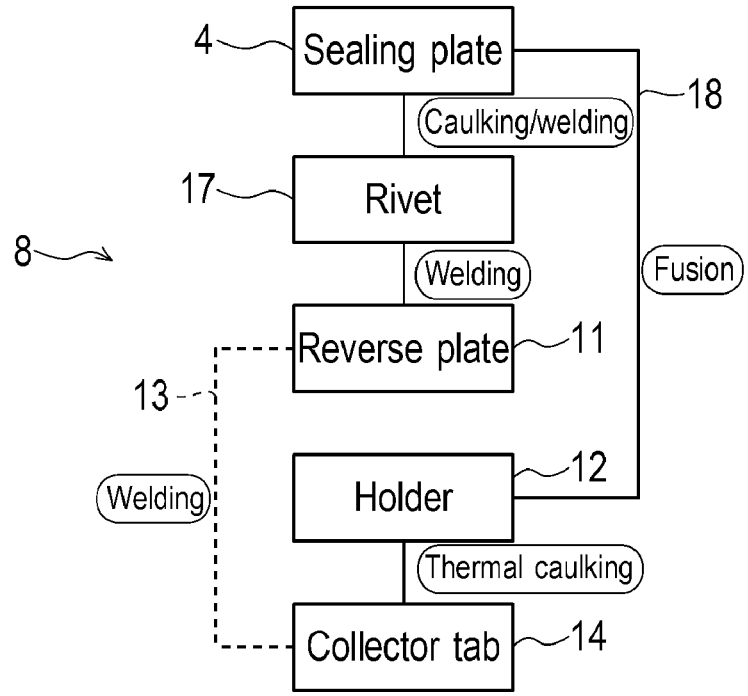

FIG. 4A schematically shows a mounting structure around the current interrupt device 8 in the positive electrode 5 of the secondary battery 1.

As shown in FIG. 4A, in the positive electrode 5, the reverse plate 11 is mounted by welding to a lower end portion of the rivet 17 caulked on the sealing plate 4. An end portion of a portion of the rivet 17 extending outside is caulked and the caulked portion of the rivet 17 is laser-welded to the positive electrode terminal 16 (not shown). An entire outer peripheral edge of the reverse plate 11 is welded to the lower end portion of the rivet 17.

Furthermore, the collector tab 14 and the holder 12 are integrated with each other by thermal caulking and the reverse plate 11 and the collector tab 14 are laser-welded to each other at the welded portion 13 with a predetermined welding strength (so that the welded portion 13 is ruptured at the predetermined internal pressure). At the welded portion 13, the reverse plate 11 and the collector tab 14 are welded to each other through an entire outer periphery of the through hole 15.

In the secondary battery 1 according to the one embodiment of the present invention, the adhered portions 18 where the holder 12 is fused to the sealing plate 4 are formed and the holder 12 is directly fixed to the sealing plate 4.

Figure 4B:
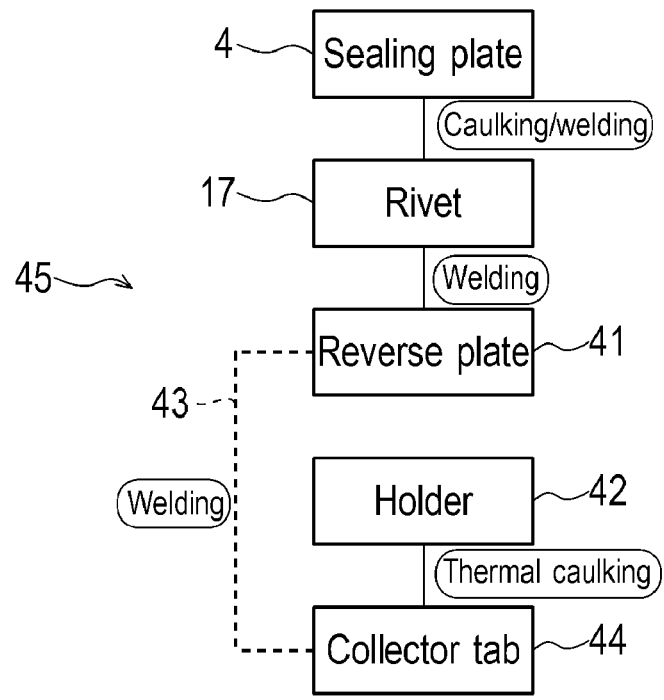
Figure 7:
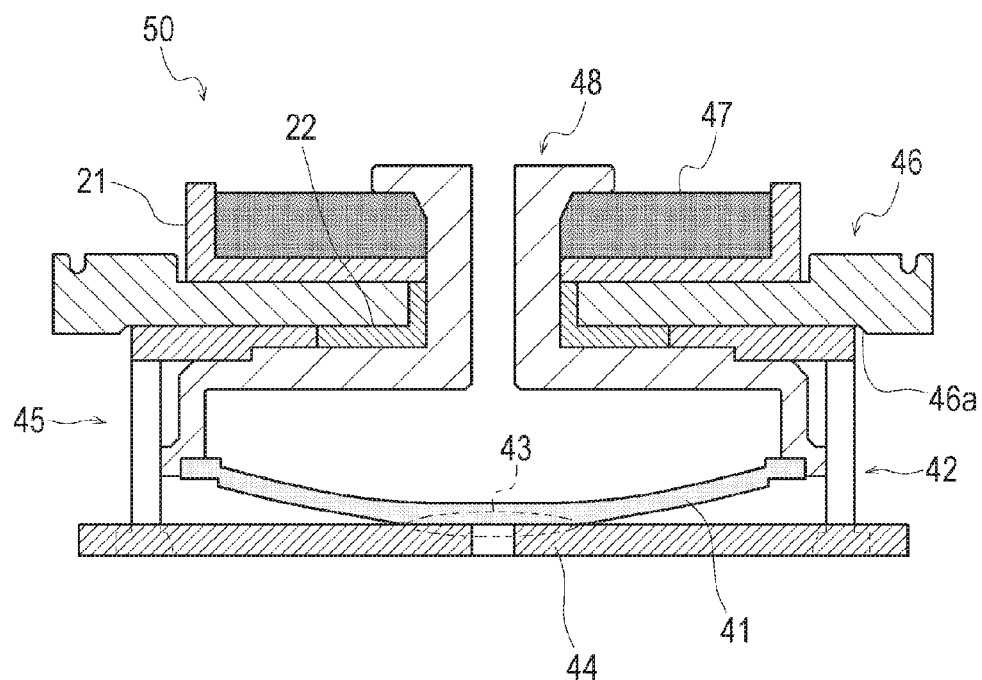
FIG. 7 shows a structure around a current interrupt device (a section along line A-A in FIG. 1) in the conventional secondary battery.
Figure 8:
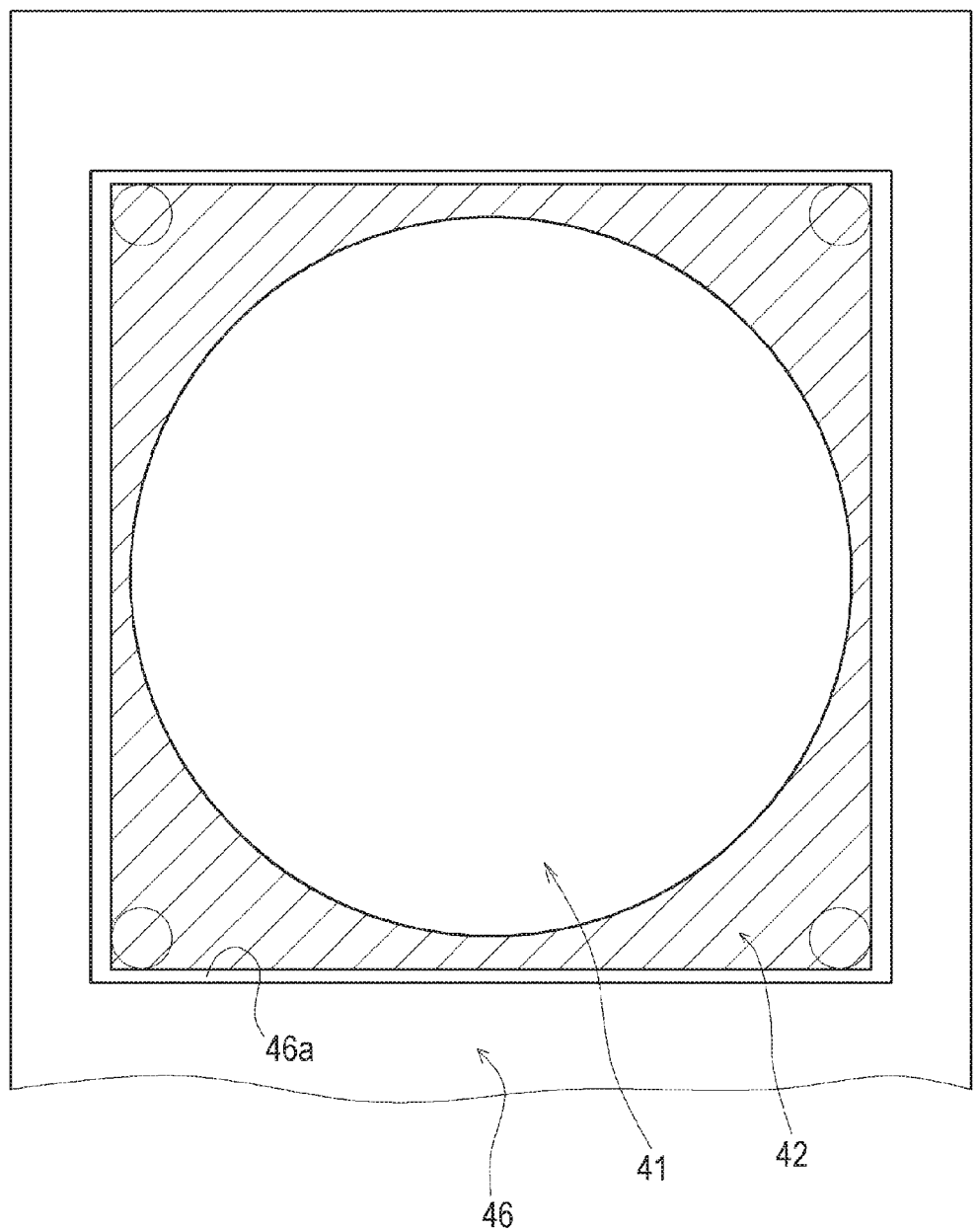
FIG. 8 shows a condition in which a holder is fixed to a sealing plate in the conventional secondary battery.

On the other hand, FIG. 4B schematically shows a mounting structure around a current interrupt device 45 in a conventional positive electrode 50 (see FIGS. 7 and 8).

As shown in FIG. 4B, in the positive electrode 50, a reverse plate 41 is mounted by welding to a lower end portion of a rivet 48 caulked on a sealing plate 46. The caulked rivet 48 is laser-welded to a positive electrode terminal 47 (not shown).

A collector tab 44 and a holder 42 are integrated with each other by thermal caulking and the reverse plate 41 and the collector tab 44 are laser-welded to each other with a predetermined welding strength (so that a welded portion is ruptured at predetermined internal pressure).

In the positive electrode 50 in the conventional secondary battery, the holder 42 is not directly fixed to the sealing plate 46, which is different from the secondary battery 1 according to the one embodiment of the present invention.

Figure 2B:
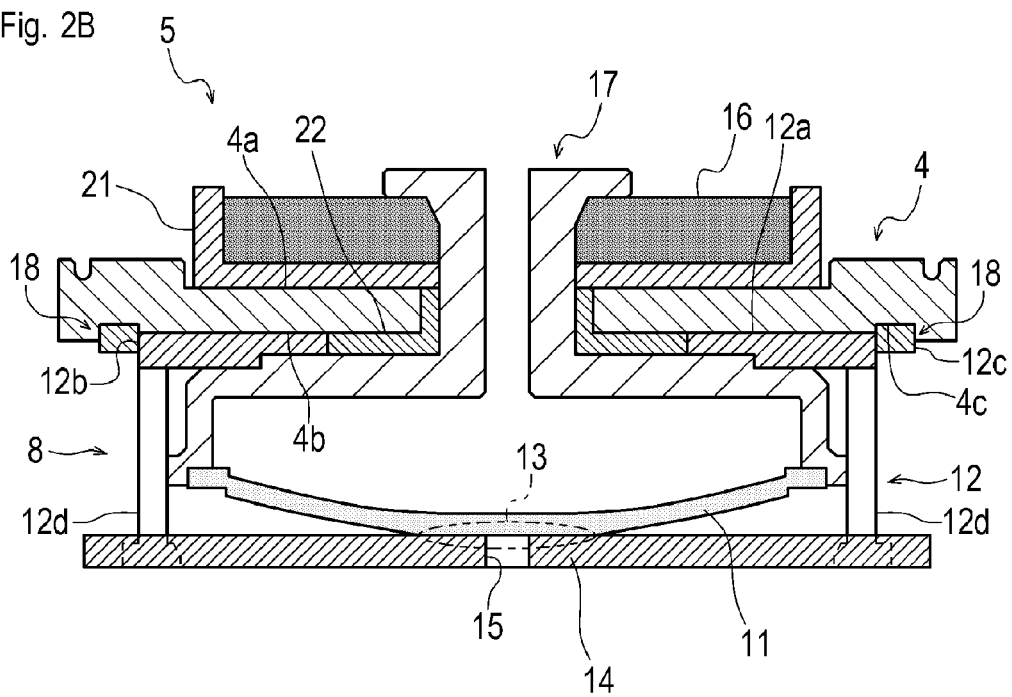

FIG. 2B shows a second embodiment of the structure around the positive electrode 5 in the secondary battery 1.

As shown in FIG. 2B, in the positive electrode 5 in the secondary battery 1 according to the second embodiment, protrusions 12c formed at the holder 12 are formed to protrude from a main body 12a of the holder 12 in the direction in which the sealing plate 4 and the holder 12 are stacked, and the recess 4c is formed by partially digging the lower face 4b. In the embodiment, not the entire main body 12a of the holder 12 but only the protrusions 12c are fitted in the recess 4c in the embodiment.

In other words, in the secondary battery 1 according to the one embodiment of the present invention, the entire main body 12a of the holder 12 may be fitted in the recess 4c as shown in FIG. 2A, or alternatively, only the protrusions 12c formed at the main body 12a of the holder 12 may be fitted in the recess 4c as shown in FIG. 2B.

Figure 5:
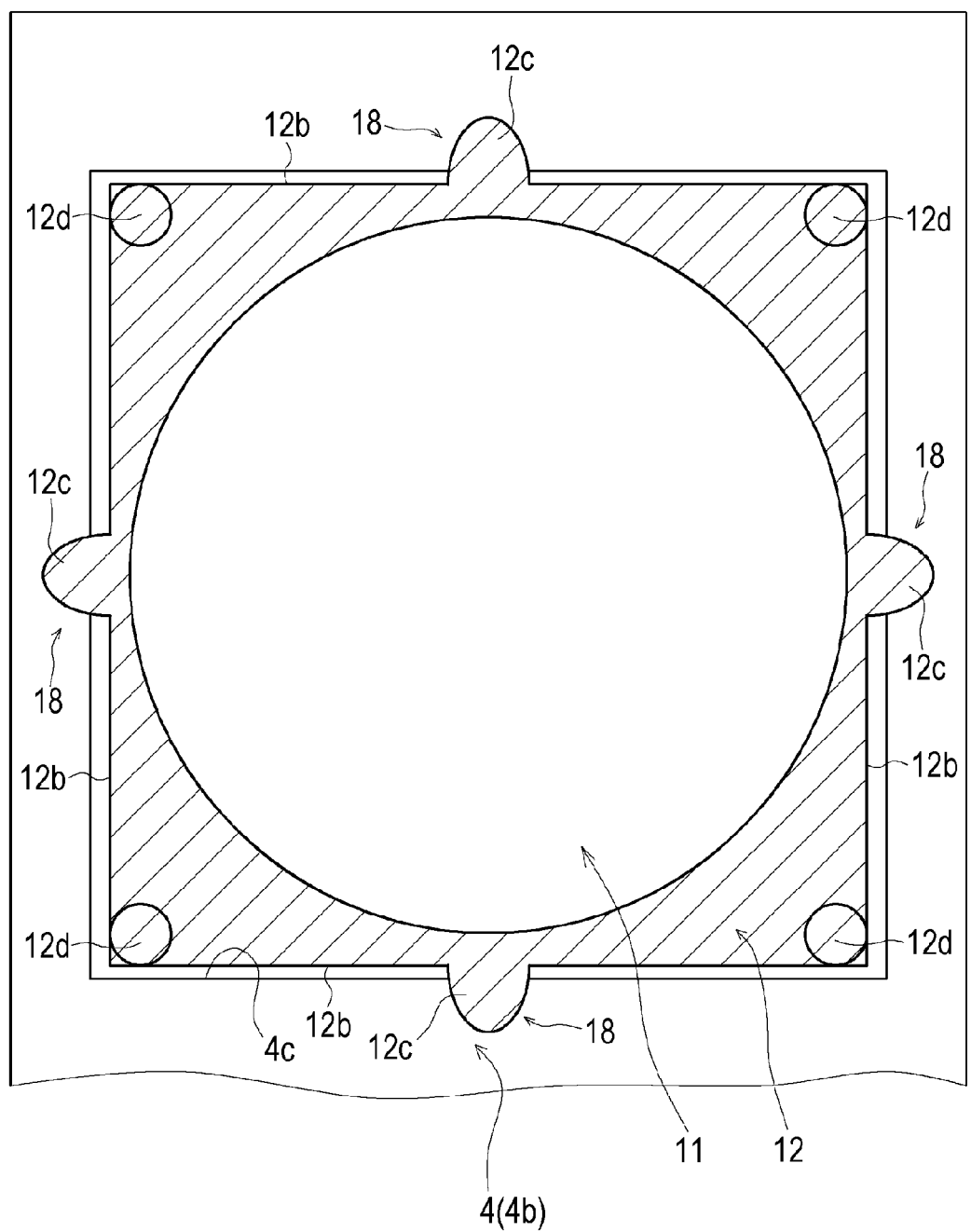
FIG. 5 shows a condition (the second embodiment) in which adhered portions are formed in the secondary battery according to the one embodiment of the present invention.
Figure 6:
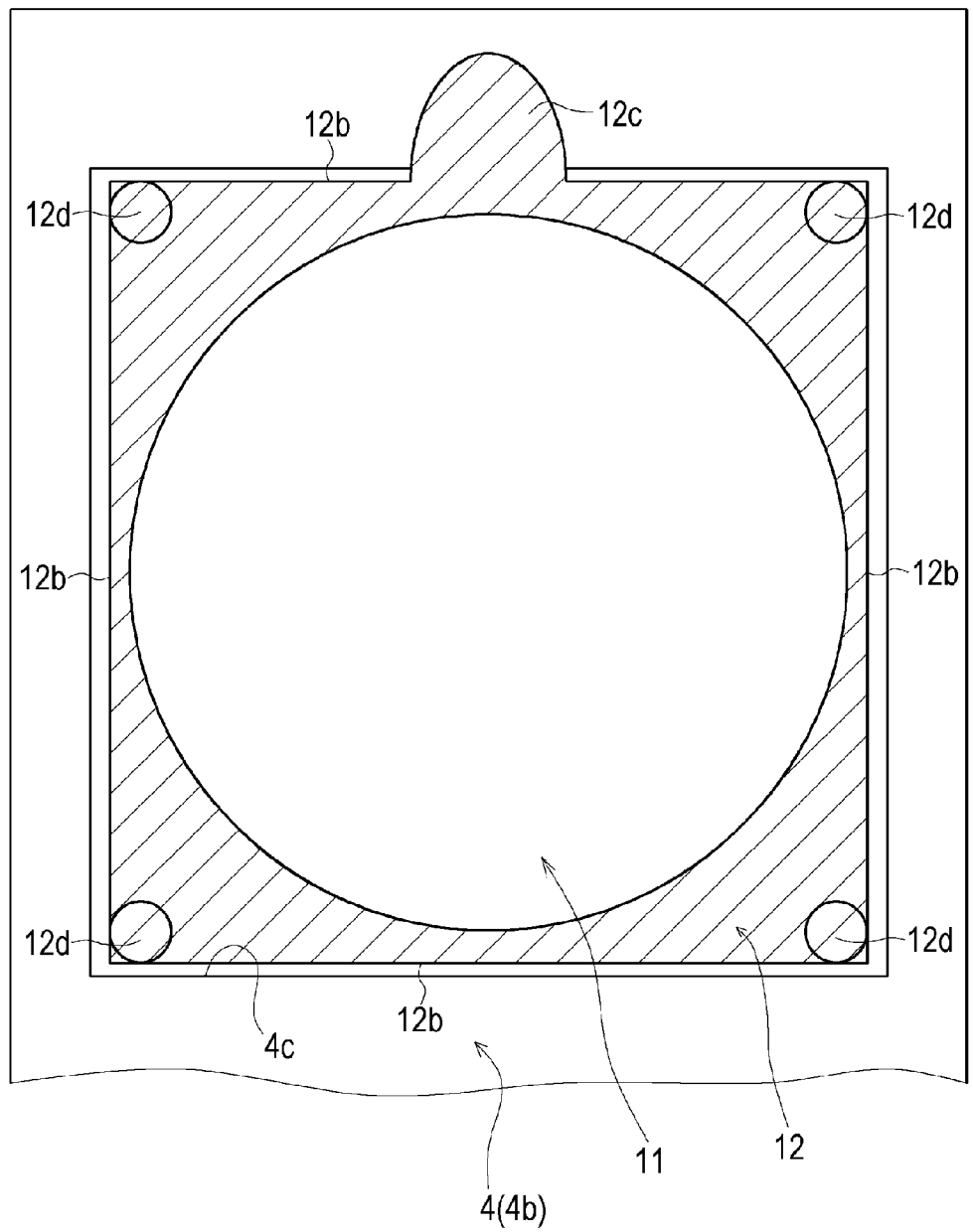
FIG. 6 shows a condition (the third embodiment) in which an adhered portion is formed in the secondary battery according to the one embodiment of the present invention.

FIGS. 5 and 6 show other examples of a manner of forming the adhered portion(s) 18 in the secondary battery 1.

Although the two protrusions 12c are provided at each of opposed paired end faces 12b of the main body 12a of the holder 12 to form the four adhered portions 18 in total in the embodiment shown in FIG. 3, the manner of forming the adhered portions 18 in the secondary battery 1 is not limited to it.

For example, as shown in FIG. 5, the adhered portions 18 in the secondary battery 1 may be formed in such a manner that one protrusion 12c is formed at each of four end faces 12b of a main body 12a of the holder 12 to form four adhered portions 18 in total.

Alternatively, for example, as shown in FIG. 6, the adhered portion 18 in the secondary battery 1 may be formed in such a manner that only one protrusion 12c is formed at only one of four end faces 12b of a main body 12a of the holder 12 to form one adhered portion 18.

In this case, the adhered portion 18 is increased in size (protruding height and width) as compared with those shown in FIGS. 3 and 5 so as to obtain enough adhering force to prevent displacement of the holder 12 with respect to the sealing plate 4 and generation of vibration with the one adhered portion 18.

The secondary battery 1 according to the one embodiment of the invention may employ not only the manner of forming of the adhered portions 18 shown in FIG. 3 but also the manners of forming shown in FIGS. 5 and 6 and it is possible to arbitrarily select the number, places, and shapes of adhered portions 18 to be formed.

The secondary battery 1 according to the one embodiment of the present invention includes the rivet 17, the collector tab 14, the current interrupt device 8 which includes the reverse plate 11 acting as a diaphragm and connected to the rivet 17, and the holder 12 as an insulator for holding the collector tab 14, and which is formed by welding the reverse plate 11 to the collector tab 14 at a predetermined welding strength, the positive electrode terminal 16, the sealing plate 4 which is joined to the positive electrode terminal 16 and the holder by the rivet 17, the positive electrode terminal 16 being placed on the upper face 4a of the sealing plate 4, the holder 12 being placed on the lower face 4b of the sealing plate 4, and the adhered portion 18 for adhering the holder 12 to the sealing plate 4.

The method of manufacturing the secondary battery 1 according to the one embodiment of the present invention includes a first step for preparing the rivet 17, a second step for preparing the collector tab 14, a third step for preparing the current interrupt device 8 which includes the reverse plate 11 acting as a diaphragm and connected to the rivet 17, and the holder 12 as an insulator for holding the collector tab 14, and which is formed by welding the reverse plate 11 to the collector tab 14 at a predetermined welding strength, a fourth step for preparing the positive electrode terminal 16, a fifth step for preparing the sealing plate 4, a sixth step for joining the positive electrode terminal 16 and the holder 12 to the sealing plate 4 with the rivet 17 while placing the positive electrode terminal 16 on the upper face 4a of the sealing plate 4 and placing the holder 12 on the lower face 4b of the sealing plate 4, and a seventh step for adhering the holder 12 to the sealing plate 4.

Thereby, damage to the welded portion 13 between the reverse plate 11 and the collector tab 14 caused by transmission of the vibration can be prevented. As a result, a malfunction of the current interrupt device 8 can be prevented, and airtightness of the secondary battery 1 can be secured, which improves quality of the secondary battery 1.

Preferably, in the secondary battery 1 according to the one embodiment of the present invention, the sealing plate 4 includes the recess 4c conforming in shape to the holder 12, the recess 4c being formed on the lower face 4b of the sealing plate 4. The holder 12 includes the protrusion 12c protruding in a direction perpendicular to a direction in which the holder 12 and the sealing plate 4 are stacked. The adhered portion 18 is formed by adhering the protrusion 12c to the sealing plate 4 while the holder 12 is fitted in the recess 4c.

Preferably, the method of manufacturing the secondary battery 1 according to the one embodiment of the present invention further includes a step for forming the recess 4c conforming in shape to the holder 12 on the lower face 4b of the sealing plate 4, and a step for forming the protrusion 12c on the holder 12, the protrusion 12c protruding in a direction perpendicular to a direction in which the holder 12 and the sealing plate 4 are stacked. In the seventh step, the protrusion 12c is adhered to the sealing plate 4 while the holder 12 is fitted in the recess 4c.

Thereby, the sealing plate 4 and the holder 12 can be easily adhered to each other, and damage to the welded portion 13 can be prevented with a simple structure.

Preferably, in the secondary battery 1 according to the one embodiment of the present invention, the adhered portion 18 is formed by fusing the protrusion 12c to the sealing plate 4 while the holder 12 is fitted in the recess 4c.

Preferably, in the method of manufacturing the secondary battery 1 according to the one embodiment of the present invention, in the seventh step, the protrusion 12c is fused to the sealing plate 4 while the holder 12 is fitted in the recess 4c.

Thereby, the sealing plate 4 and the holder 12 can be more easily and reliably adhered to each other.

Next, results of experiments for testing whether damage to the welded portion 13 of the current interrupt device 8 is caused in the secondary battery 1 according to the one embodiment of the present invention will be described.

In the experiments, four types of batteries according to examples 1 to 4 were prepared as the secondary battery 1 according to the one embodiment of the present invention and comparative example 1 (one type) was prepared as the conventional secondary battery.

Vibration experiments were conducted on these five types of secondary batteries in total. Whether a malfunction occurred was checked in a simulating manner by diagnosing presence of damage to the welded portion.

In the experiments, ten secondary batteries were prepared for each of comparative example 1 and examples 1 to 4, the vibration experiments were conducted on the fifty secondary batteries in total, and each of the examples was evaluated based on the results of the experiments on the ten secondary batteries.

Each of the secondary batteries 1 according to example 1 used in the experiments corresponds to the embodiment shown in FIGS. 2A and 3, in which two (four in total) adhered portions 18 are formed at each of two opposed end faces 12b of a rectangular main body 12a.

Each of the secondary batteries 1 according to example 2 used in the experiments corresponds to the embodiment shown in FIGS. 2B and 3, in which two (four in total) adhered portions 18 are formed at each of two opposed end faces 12b of a rectangular main body 12a and which is different in forms of a recess 4c and protrusions 12c from example 1.

Each of the secondary batteries 1 according to example 3 used in the experiments corresponds to the embodiment shown in FIG. 5, in which one (four in total) adhered portion(s) 18 is (are) formed at a substantially central position of each of four end faces 12b of a rectangular main body 12a.

Each of the secondary batteries 1 according to example 4 used in the experiments corresponds to the embodiment shown in FIG. 6, in which one adhered portion 18 is formed at one end face 12b of a rectangular main body 12a. The adhered portion 18 of the secondary battery 1 according to example 3 is greater in protruding height and width than the adhered portions 18 in examples 1 to 3.

Each of the secondary batteries according to comparative example 1 used in the experiments corresponds to the form shown in FIGS. 7 and 8, which does not have an adhered portion.

The vibration experiment in the experiments was conducted by vibrating each of the secondary batteries for 60 minutes in each of directions of three axes at a maximum acceleration of 50 m/s$^2$, with maximum amplitude of 0.6 mm, and at a frequency of 50 Hz. Before and after the vibration experiment, battery resistance of each of the secondary batteries was measured and the presence of damage to the welded portion was diagnosed based on a change in the battery resistance.

According to the results of the experiments, increase in the battery resistance did not occur in any of the secondary batteries in examples 1 to 4 which are the secondary batteries 1 according to the one embodiment of the present invention.

On the other hand, in the secondary batteries according to comparative example 1 which are the conventional secondary batteries, increase in the battery resistance occurred in three out of ten secondary batteries. When each of the secondary batteries with increased battery resistance was disassembled and observed, the welded portion between the reverse plate and the collector tab was found to be ruptured.

From the results of the experiments, it was found that the rupture of the welded portion 13 was reliably prevented even when the secondary battery 1 was vibrated, if the sealing plate 4 and the holder 12 were directly adhered (i.e., the adhered portion(s) 18 was (were) provided) as in the secondary battery 1 according to the one embodiment of the present invention.

REFERENCE SIGNS LIST

1: secondary battery
4: sealing plate
4a: upper face
4b: lower face
4c: recess
8: current interrupt device
11: reverse plate
12: holder
12c: protrusion
13: welded portion
14: collector tab
16: positive electrode terminal
17: rivet
18: adhered portion

What is claimed is:

1. A secondary battery comprising:
a sealing plate;
a positive electrode terminal placed on an upper face of the sealing plate;
a holder as an insulator placed on a lower face of the sealing plate;
a rivet for joining the positive electrode terminal, the sealing plate and the holder;
a collector tab held by the holder;
a reverse plate as a diaphragm and connected to the rivet, and which is welded to the collector tab at a predetermined welding strength as a current interrupt device; and
an adhered portion for adhering the holder to the sealing plate; wherein
the holder has a main body which is a plate-shaped portion to be in contact with the lower face of the sealing plate, and at least one protrusion protruding from an end face of the main body in a direction perpendicular to a direction in which the holder and the sealing plate are stacked, and wherein
the sealing plate has a recess in the lower face, and the main body of the holder is fitted in the recess, and wherein
the adhered portion is formed by adhering the protrusion to the lower face of the sealing plate.

2. The secondary battery according to claim 1, wherein the sealing plate and the protrusion are fused at the adhered portion.

3. A secondary battery comprising:
a sealing plate;
a positive electrode terminal placed on an upper face of the sealing plate;
a holder as an insulator placed on a lower face of the sealing plate;
a rivet for joining the positive electrode terminal, the sealing plate and the holder;
a collector tab held by the holder;
a reverse plate as a diaphragm and connected to the rivet, and which is welded to the collector tab at a predetermined welding strength; and
an adhered portion for adhering the holder to the sealing plate;
wherein the holder has a main body which is a plate-shaped portion to be in contact with the lower face of the sealing plate, and at least one protrusion protruding from an end face of the main body in a direction perpendicular to a direction in which the holder and the sealing plate are stacked, and wherein
the sealing plate has a recess in the lower face, and the protrusion of the holder is fitted in the recess, and wherein
the adhered portion is formed by adhering the protrusion to the recess of the sealing plate.

4. The secondary battery according to claim 3, wherein the sealing plate and the protrusion are fused at the adhered portion.

5. The secondary battery according to claim 1, wherein the at least one protrusion is disposed radially outward from the recess.

6. The secondary battery according to claim 3, wherein the main body of the holder is not fitted in the recess.

* * * * *